(12) United States Patent
Nakamura et al.

(10) Patent No.: US 9,429,412 B2
(45) Date of Patent: Aug. 30, 2016

(54) HOLE-SHAPE MEASURING APPARATUS AND HOLE-SHAPE MEASURING METHOD

(71) Applicant: MITSUBISHI HEAVY INDUSTRIES, LTD., Tokyo (JP)

(72) Inventors: Mikio Nakamura, Tokyo (JP); Hirofumi Ienaga, Tokyo (JP); Yoshihito Fujita, Tokyo (JP); Kazuo Okamoto, Osaka (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 246 days.

(21) Appl. No.: 14/363,038

(22) PCT Filed: Jan. 18, 2013

(86) PCT No.: PCT/JP2013/050932
§ 371 (c)(1),
(2) Date: Jun. 5, 2014

(87) PCT Pub. No.: WO2013/108875
PCT Pub. Date: Jul. 25, 2013

(65) Prior Publication Data
US 2015/0040414 A1    Feb. 12, 2015

(30) Foreign Application Priority Data
Jan. 20, 2012    (JP) .................. 2012-010478

(51) Int. Cl.
*G01B 5/20* (2006.01)
*G01B 5/12* (2006.01)
*G01B 5/18* (2006.01)

(52) U.S. Cl.
CPC . *G01B 5/20* (2013.01); *G01B 5/12* (2013.01); *G01B 5/18* (2013.01); *G01B 2210/00* (2013.01)

(58) Field of Classification Search
CPC ............. G01B 5/12; G01B 5/18; G01B 5/20
USPC .................... 33/542, 544, 836, 832
See application file for complete search history.

(56) References Cited

U.S. PATENT DOCUMENTS

| 3,116,560 A | 7/1961 | Matthews |
| 4,753,555 A | 6/1988 | Thompson et al. |

(Continued)

FOREIGN PATENT DOCUMENTS

| CN | 85 1 07031 | 4/1987 |
| CN | 2156475 | 2/1994 |

(Continued)

OTHER PUBLICATIONS

Extended European Search Report issued Aug. 5, 2015 in corresponding European Patent Application No. 13738066.3.

(Continued)

*Primary Examiner* — Yaritza Guadalupe-McCall
(74) *Attorney, Agent, or Firm* — Wenderoth, Lind & Ponack, L.L.P.

(57) ABSTRACT

A hole-shape measuring apparatus is provided with a hole diameter measuring mechanism which measures the diameter of a flush bolt hole, and a countersunk head depth measuring mechanism which measures a countersunk head depth. The hole diameter measuring mechanism has a hole diameter measuring rod configured so as to be inserted into a constant portion at a tip portion and displaced according to the diameter of the constant portion, and a hole diameter measuring sensor which measures the amount of displacement of the hole diameter measuring rod. The countersunk head depth measuring mechanism has a countersunk head depth measuring rod configured so as to be inserted into a countersunk head portion at a tip portion and displaced according to the countersunk head depth, and a countersunk head depth measuring sensor which measures the amount of displacement of the countersunk head depth measuring rod.

13 Claims, 18 Drawing Sheets

(56) References Cited

U.S. PATENT DOCUMENTS

| | | | | |
|---|---|---|---|---|
| 4,996,492 A * | 2/1991 | Anderson | ................ | G01B 7/13 |
| | | | | 324/662 |
| 5,189,808 A | 3/1993 | Evan et al. | | |
| 5,758,433 A * | 6/1998 | Alberts | .................... | G01B 3/28 |
| | | | | 33/542 |
| 6,088,923 A * | 7/2000 | Guerin | .................. | G01B 5/201 |
| | | | | 33/542 |
| 2003/0217479 A1* | 11/2003 | Shen | ........................ | G01B 3/28 |
| | | | | 33/836 |
| 2007/0051003 A1 | 3/2007 | Bennison et al. | | |
| 2015/0040414 A1* | 2/2015 | Nakamura | ............... | G01B 5/12 |
| | | | | 33/542 |

FOREIGN PATENT DOCUMENTS

| | | |
|---|---|---|
| CN | 2653433 | 11/2004 |
| CN | 101403599 | 4/2009 |
| JP | 58-189902 | 12/1983 |
| JP | 59-194001 | 12/1984 |
| JP | 61-182803 | 11/1986 |
| JP | 04-138301 | 5/1992 |
| JP | 8-233504 | 9/1996 |
| JP | 2005-147843 | 6/2005 |

OTHER PUBLICATIONS

International Search Report issued Feb. 26, 2013 in International (PCT) Application No. PCT/JP2013/050932.
International Preliminary Report on Patentability and Written Opinion of the International Searching Authority issued Jul. 22, 2014 in International Application No. PCT/JP2013/050932.
Decision to Grant a Patent issued Dec. 1, 2015 in corresponding Japanese Patent Application No. 2012-010478 (partial English translation).
Office Action issued Dec. 31, 2015 in corresponding Chinese Application No. 201380006008.2 (with partial English translation).

* cited by examiner

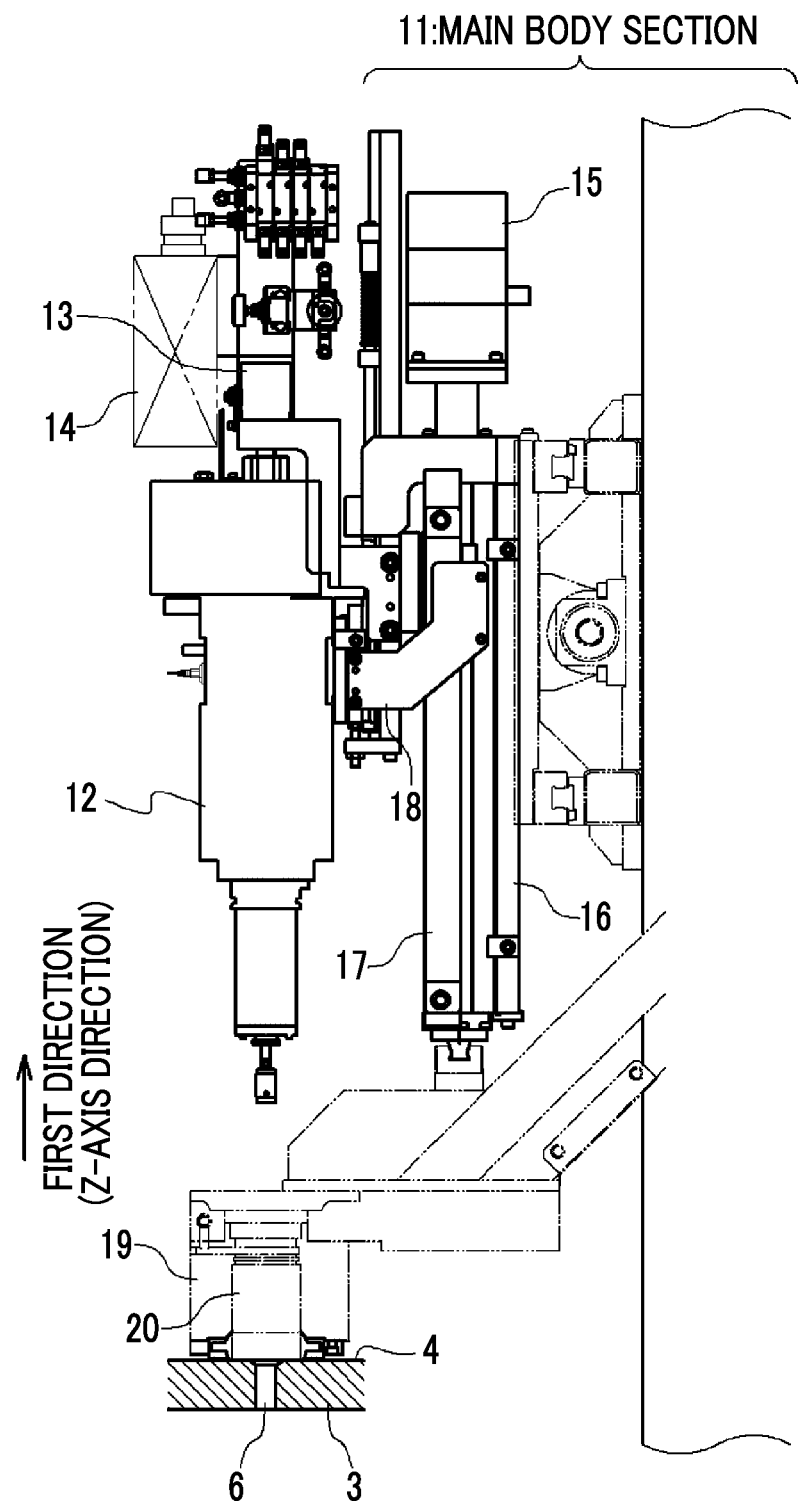

FIRST DIRECTION

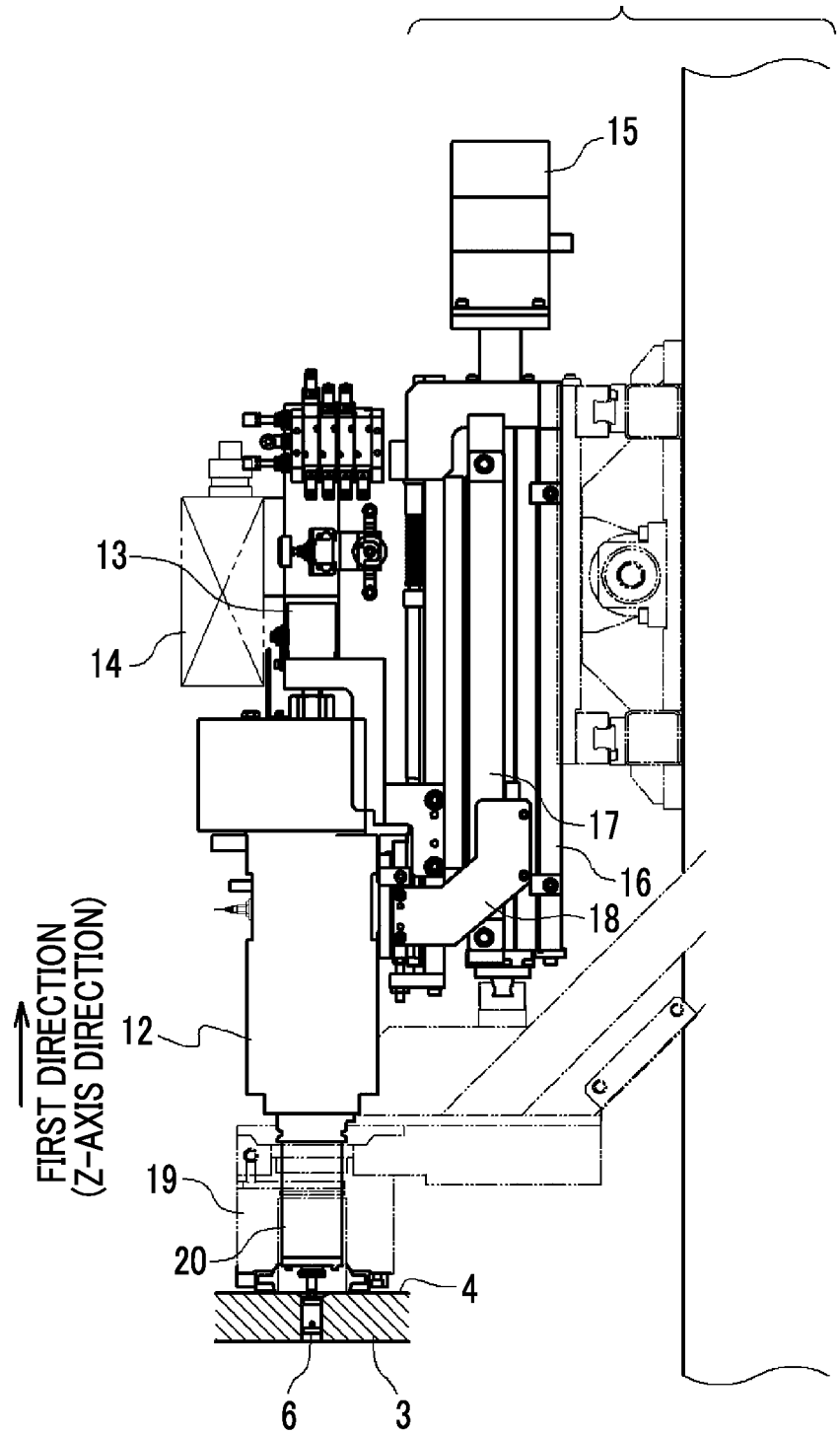

FIRST
DIRECTION
↑
⊙ → THIRD
SECOND  DIRECTION
DIRECTION

FIRST
DIRECTION
↑
⊙ → THIRD
SECOND  DIRECTION
DIRECTION

HOLE-SHAPE MEASURING APPARATUS AND HOLE-SHAPE MEASURING METHOD

TECHNICAL FIELD

The present invention relates to a hole-shape measuring apparatus and a hole-shape measuring method.

BACKGROUND ART

A flush bolt is used sometimes when fastening a member. In a case of using the flush bolt, a hole corresponding to the flush bolt (hereinafter, referred to as a flush bolt hole) is provided in the member to be fastened. The flush bolt is inserted into the flush bolt hole, whereby the member is fastened. FIG. 1 is a cross-sectional view showing an example of a flush bolt hole 6. In FIG. 1, the flush bolt hole 6 provided in a target member 3 is shown. The target member 3 has a first member 1 and a second member 2, and the first member 1 and the second member 2 are laminated. The first member 1 is a composite material. The second member 2 is a composite material or a metal material (Ti, Al, and the like). The flush bolt hole 6 extends toward a back surface 5 of the target member 3 from a principal surface 4 of the target member and has a countersunk head portion 7 and a constant portion 8. The countersunk head portion 7 is connected to an opening provided in the principal surface 4 and configured such that a diameter decreases as it becomes deeper. The constant portion 8 connects a bottom portion of the countersunk head portion 7 and an opening provided in a back surface 5. The diameter of the constant portion is constant in a depth direction. A flush bolt (not shown) is inserted into the flush bolt hole 6, whereby the first member 1 and the second member 2 are fastened to each other.

The flush bolt hole 6 is formed by a drill or the like. In order to properly fasten the members, it is important that the shape of the flush bolt hole 6 is accurately formed with the desired shape. For this reason, after the formation of the flush bolt hole 6, the shape of the flush bolt hole 6 is measured. Specifically, the countersunk head depth and the hole diameter of the flush bolt hole 6 are measured. The countersunk head depth is a depth h of a portion in which a diameter becomes the reference diameter determined in advance in the countersunk head portion 7, and the hole diameter is a diameter in the constant portion 8.

FIG. 2A is a cross-sectional view showing a method of measuring the countersunk head depth. As shown in FIG. 2A, at the time of the measurement of the countersunk head depth, a step gauge 9 is used. The step gauge 9 is provided with a rod, and the countersunk head depth is measured by inserting a tip portion of the rod into the flush bolt hole 6 which is a measurement target. Further, FIG. 2B is a cross-sectional view showing a method of measuring the hole diameter. At the time of the measurement of the hole diameter, a plunger gauge 10 is used, and similar to the time of the measurement of the countersunk head depth, the hole diameter is measured by inserting the tip of a rod provided at the plunger gauge 10 into the flush bolt hole 6.

In connection with the above, a cylindrical hole shape measuring machine is disclosed in PTL 1 (Japanese Unexamined Patent Application Publication No. 4-138301). The cylindrical hole shape measuring machine uses a pair of contacts and a pair of differential transformers which converts the amount of displacement of each contact into an electric signal.

CITATION LIST

Patent Literature

[PTL 1] Japanese Unexamined Patent Application Publication No. 4-138301

SUMMARY OF INVENTION

Incidentally, the flush bolt is used in a main wing member or the like of an aircraft. In recent years, as a material of the main wing member, instead of a metal member, a member which includes a composite material has been used. In a case where the member which includes a composite material is used as the main wing member, a greater number of flush bolts are used compared to a case the metal member is used, when fastening a plurality of members. That is, a great number of holes for flush bolts 6 are provided in a target member. Since a great number of holes for flush bolts 6 are provided, it is required to measure the shape of the flush bolt hole 6 in a short time. However, in the methods shown in FIGS. 2A and 2B, it is necessary to measure the hole diameters with respect to the entire area in a thickness direction and in directions of 0° and 90° by the plunger gauge 10 after the countersunk head depth is measured by the step gauge 9, and thus it is difficult to measure the shape of the flush bolt hole 6 in a short time.

In addition, in PTL 1, although the cylindrical hole shape measuring machine is disclosed, a method of measuring the shape of a flush bolt hole is not described.

A hole-shape measuring apparatus according to the present invention is a hole-shape measuring apparatus for measuring the shape of a flush bolt hole provided in a target member which includes a composite material. The flush bolt hole has a countersunk head portion which is connected to an opening provided in a principal surface of the target member and has a shape in which a diameter decreases as a depth from the principal surface increases, and a constant portion which is connected, at one end, to a bottom portion of the countersunk head portion and connected, at the other end, to an opening provided in a back surface of the target member and has a constant diameter. The hole-shape measuring apparatus includes a hole diameter measuring mechanism which measures the diameter of the constant portion, and a countersunk head depth measuring mechanism which measures a depth of the countersunk head portion where the diameter becomes the reference diameter determined in advance, as a countersunk head depth. The hole diameter measuring mechanism has a hole diameter measuring rod configured so as to be inserted into the constant portion at a tip portion and displaced according to the diameter of the constant portion, and a hole diameter measuring sensor which measures the amount of displacement of the hole diameter measuring rod. The countersunk head depth measuring mechanism has a countersunk head depth measuring rod configured so as to be inserted into the countersunk head portion at a tip portion and displaced according to the countersunk head depth, and a countersunk head depth measuring sensor which measures the amount of displacement of the countersunk head depth measuring rod. The hole diameter measuring rod and the countersunk head depth measuring rod are provided so as to become coaxial.

A hole-shape measuring method according to the present invention is a hole-shape measuring method of measuring the shape of a flush bolt hole provided in a target member which includes a composite material. The flush bolt hole has a countersunk head portion which is connected to an opening provided in a principal surface of the target member and has a shape in which a diameter decreases as a depth from the principal surface increases, and a constant portion which is connected, at one end, to a bottom portion of the countersunk head portion and connected, at the other end, to an opening provided in a back surface of the target member and has a constant diameter. The hole-shape measuring method includes a step of measuring the diameter of the constant portion by inserting a tip of a hole diameter measuring rod into the constant portion, and a step of measuring a countersunk head depth of the countersunk head portion by inserting a tip of a countersunk head depth measuring rod provided so as to become coaxial with the hole diameter measuring rod into the countersunk head portion.

According to the present invention, a hole-shape measuring apparatus and a hole-shape measuring method are provided in which it is possible to measure the shape of a flush bolt hole in a short time.

BRIEF DESCRIPTION OF DRAWINGS

FIG. 3 is a cross-sectional view showing a hole-shape measuring apparatus according to an embodiment.

FIG. 9 is a cross-sectional view showing a state where the measuring head is inserted into an opening.

DESCRIPTION OF EMBODIMENTS

Hereinafter, an embodiment of the present invention will be described with reference to the drawings.

Figure 1:
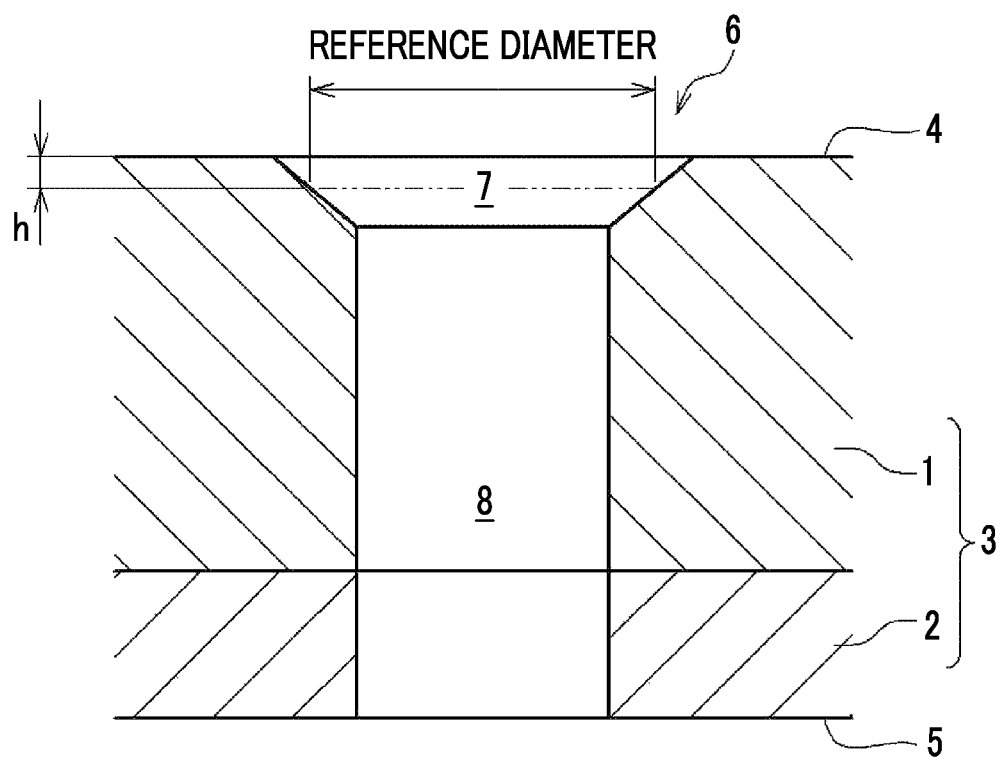
FIG. 1 is a cross-sectional view showing an example of a flush bolt hole.
Figure 2A:
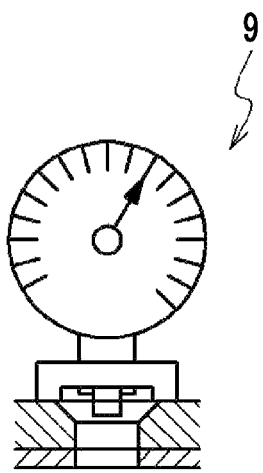
FIG. 2A is a cross-sectional view showing a method of measuring a countersunk head depth.
Figure 2B:
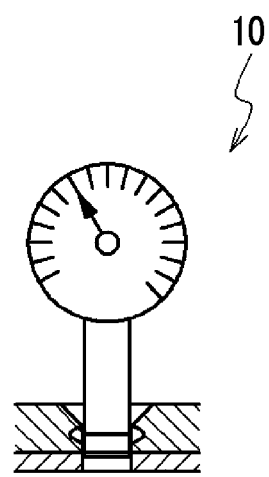
FIG. 2B is a cross-sectional view showing a method of measuring a hole diameter.

FIG. 3 is a cross-sectional view showing a hole-shape measuring apparatus according to this embodiment. As shown in FIG. 3, the hole-shape measuring apparatus is used to measure the shape of a flush bolt hole 6 provided in a target member 3. Similar to the example shown in FIG. 1, the target member 3 has a first member 1 and a second member 2. For example, the first member 1 is a composite material, and the second member 2 is a composite material or a metal material (Ti or Al). In addition, the flush bolt hole 6 has a countersunk head portion 7 and a constant portion 8, similar to the example shown in FIG. 1. Further, the target member 3 is set to be a main wing member of an aircraft, which includes a composite material.

The hole-shape measuring apparatus is provided with a main body section 11, a measuring mechanism 12, a balance air cylinder 13, and a pressure foot 19.

The main body section 11 is a section which holds the measuring mechanism 12 and the pressure foot 19. The main body section 11 has a Z-axis slide unit 16, a Z-axis servomotor 15, a Z-axis position detection sensor 17, and an arm 18. The arm 18 is a section which holds the measuring mechanism 12 and is held by the Z-axis slide unit 16 so as to be able to move along a Z-axis direction (a first direction). The Z-axis servomotor 15 is a motor which moves the arm 18 along the first direction. The Z-axis position detection sensor 17 has a function to detect the position on a Z-axis of the arm 18. In addition, the main body section 11 is disposed over the target member 3 such that the first direction is a direction perpendicular to a principal surface 4.

The pressure foot 19 is provided in order to make the principal surface 4 of the target member 3 flat. The pressure foot 19 is supported on the main body section 11 and configured so as to hold down the principal surface 4. There is a case where the principal surface 4 of the target member 3 is curved. In a case where the principal surface 4 is curved, there is a case where it is difficult to accurately measure a hole shape. In contrast, in this embodiment, since the principal surface 4 is held down by the pressure foot 19, the principal surface 4 is made flat, and thus it becomes possible to accurately measure a hole shape. In addition, an opening 20 is provided in the pressure foot 19. The pressure foot 19 holds down the principal surface 4 such that the flush bolt hole 6 is exposed through the opening 20.

The balance air cylinder 13 is provided in order to adjust the position in the first direction of the measuring mechanism 12. A balance adjustment pressure reducing valve 14 is provided at the balance air cylinder 13. The balance air cylinder 13 is controlled by the balance adjustment pressure reducing valve 14, and thus the position of the measuring mechanism 12 is adjusted. Deflection sometimes occurs between the measuring mechanism 12 and the main body section 11 due to the weight of the measuring mechanism 12. In the main wing member, usually, the flush bolt hole 6 is provided in each of the upper surface and the lower surface. Therefore, the hole-shape measuring apparatus is sometimes disposed on each of the upper surface and the lower surface of the main wing member. In a case where the hole-shape measuring apparatus is disposed on the upper surface of the main wing member, deflection sometimes occurs such that the measuring mechanism 12 approaches the main wing member (the target member 3). On the other hand, in a case where the hole-shape measuring apparatus is disposed on the lower surface of the main wing member, deflection sometimes occurs such that the measuring mechanism 12 becomes more distant from the main wing member (the target member 3). By providing the balance air cylinder 13, it is possible to cancel the deflection, and thus it becomes possible to match the position in the first direction of the measuring mechanism 12 to a desired position.

Subsequently, the measuring mechanism 12 will be described.

Figure 4A:
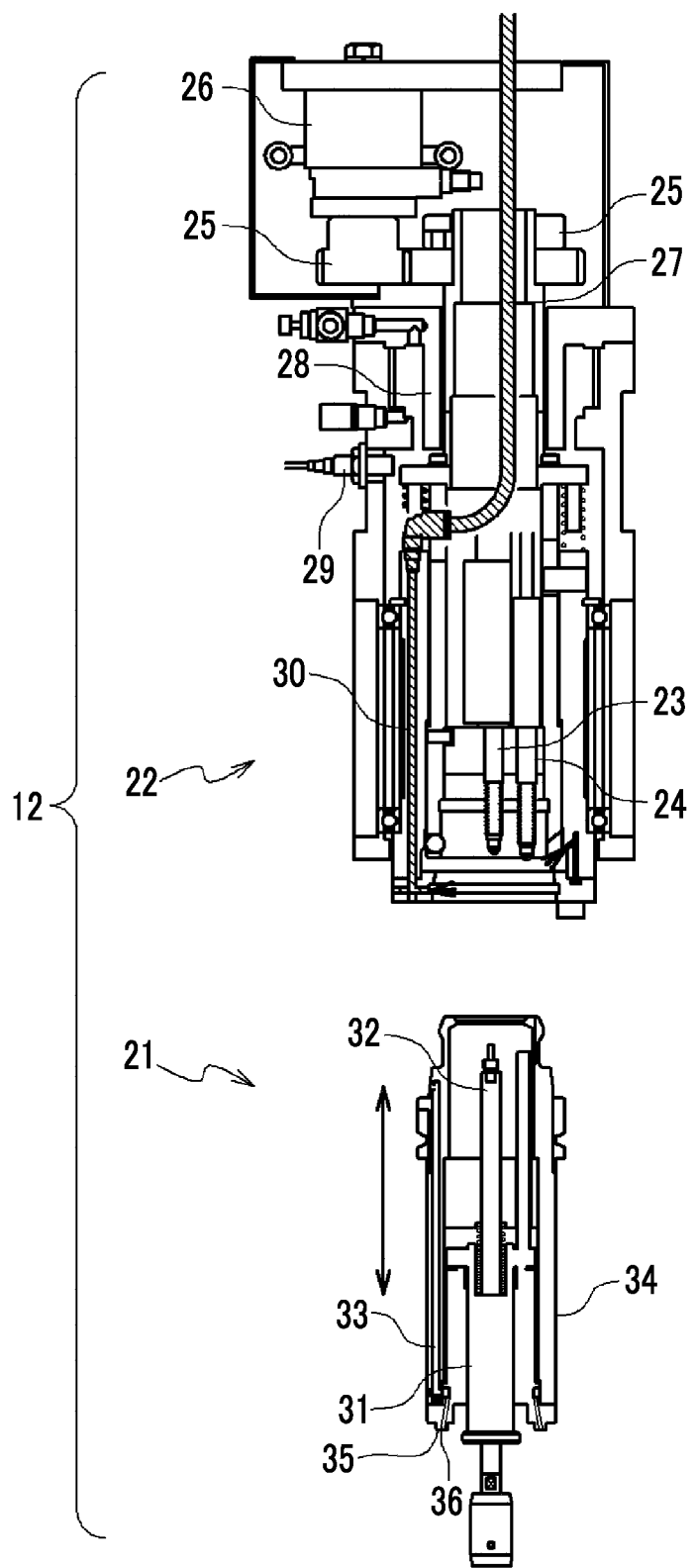
FIG. 4A is a cross-sectional view showing a measuring mechanism.

The measuring mechanism 12 has a function to measure the shape of the flush bolt hole 6. FIG. 4A is a cross-sectional view showing the measuring mechanism 12. As shown in FIG. 4A, the measuring mechanism 12 has a measuring head 21 and a measuring head holding mechanism 22. The measuring head 21 is held by the measuring head holding mechanism 22 so as to become detachable. Various types of holes for flush bolts 6 are provided in the target member 3. Therefore, a plurality of types of measuring heads 21 are used according to the shape of the flush bolt hole 6 which is a measurement target. At the time of measurement, the measuring head 21 according to the shape of the flush bolt hole 6 which is the measurement target is selected and mounted on the measuring head holding mechanism 22.

As shown in FIG. 4A, the measuring head 21 is provided with a measuring head main body 34, a countersunk head depth measuring rod 31, and a hole diameter measuring rod 32. The measuring head main body 34 has a tubular shape. The countersunk head depth measuring rod 31 and the hole diameter measuring rod 32 are disposed inside the measuring head main body 34 and supported by the measuring head main body 34. Further, the measuring head main body 34 is provided with an air flow path 33 and a measurement reference plane 35. The measurement reference plane 35 is provided at the tip of the measuring head main body 34. An opening 36 is provided in the measurement reference plane 35 and the air flow path 33 is connected to the opening 36.

On the other hand, the measuring head holding mechanism 22 is provided with a measuring head chuck confirmation sensor 29, a measuring head mounting-and-dismounting air cylinder 28, a measuring head rotation gear 25, a measuring head turning actuator 26, an air blow hose 27, an air flow path 30, a hole diameter measuring sensor 23, and a countersunk head depth measuring sensor 24. The measuring head chuck confirmation sensor 29 has a function to detect the mounting of the measuring head 21. The measuring head mounting-and-dismounting air cylinder 28 has a function to control the mounting and dismounting of the measuring head 21. The measuring head rotation gear 25 is controlled by the measuring head turning actuator 26 and has a function to rotate the measuring head 21. The air blow hose 27 is configured such that air is introduced therein, and the tip of the air blow hose 27 is connected to the air flow path 30. The air flow path 30 is provided so as to be connected to the air flow path 33 provided in the measuring head 21, in a case where the measuring head 21 is mounted. The hole diameter measuring sensor 23 is provided with a rod-shaped rod portion and has a function to measure the displacement of the rod portion. The countersunk head depth measuring sensor 24 is also provided with a rod-shaped rod portion, similar to the hole diameter measuring sensor 23, and has a function to measure the displacement of the rod portion.

Figure 4B:
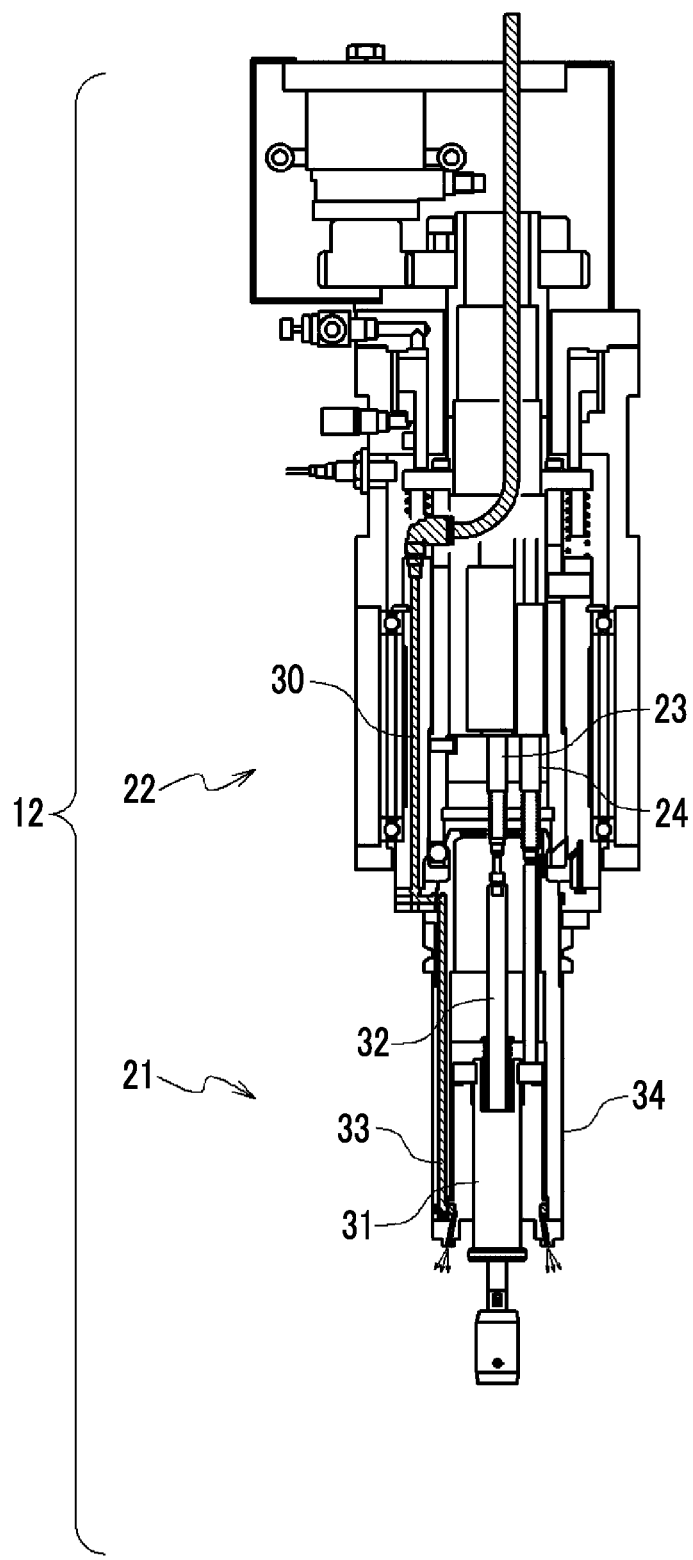
FIG. 4B is a cross-sectional view showing a state where a measuring head is mounted on a measuring head holding mechanism.

FIG. 4B is a cross-sectional view showing a state where the measuring head 21 is mounted on the measuring head holding mechanism 22. As shown in FIG. 4B, the hole diameter measuring sensor 23 is disposed such that the rod portion comes into contact with the hole diameter measuring rod 32. Similarly, the countersunk head depth measuring sensor 24 is also disposed such that the rod portion comes into contact with the countersunk head depth measuring rod 31. In addition, a hole diameter measuring mechanism which continuously measures a hole diameter is realized by the hole diameter measuring sensor 23 and the hole diameter measuring rod 32. Further, a countersunk head depth measuring mechanism is realized by the countersunk head depth measuring sensor 24 and the countersunk head depth measuring rod 31.

Figure 5:
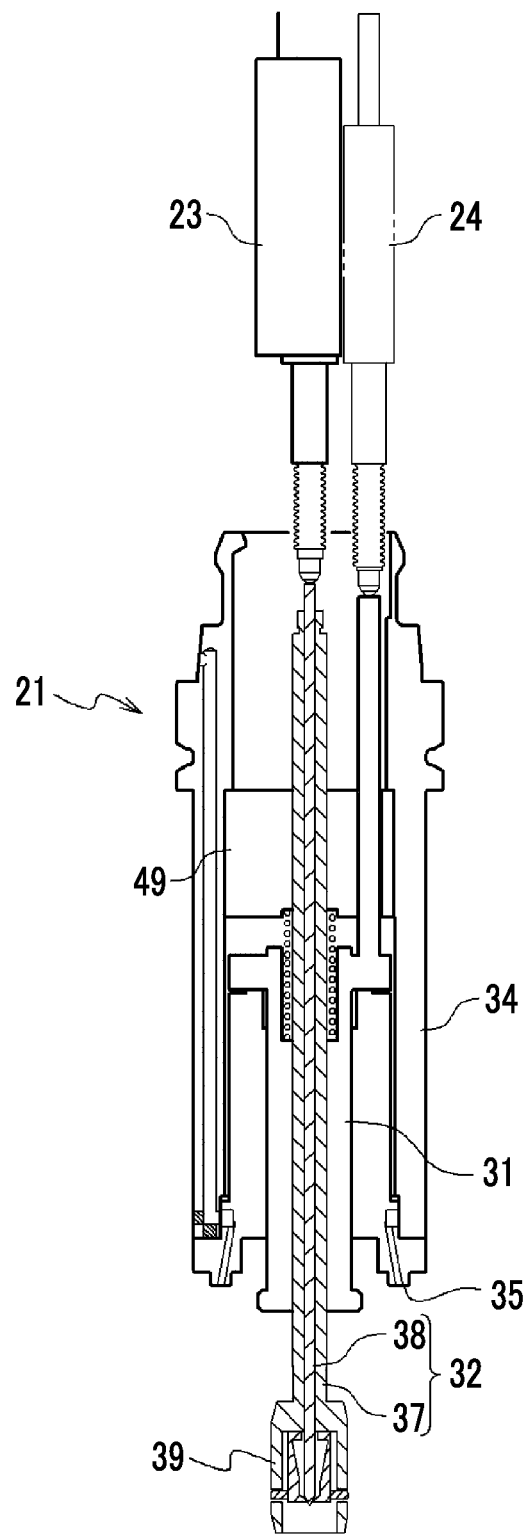
FIG. 5 is a cross-sectional view showing the measuring head.

Subsequently, the hole diameter measuring mechanism will be described. FIG. 5 is a cross-sectional view showing the measuring head 21 and is a cross-sectional view showing the hole diameter measuring mechanism. As shown in FIG. 5, a holding member 49 with an opening provided therein is fixed into the measuring head main body 34. The hole diameter measuring rod 32 is disposed so as to pass through the opening of the holding member 49 and is supported by the holding member 49. The hole diameter measuring rod 32 has an external cylinder 37 and a rod 38 disposed in the external cylinder 37. The external cylinder 37 is fixed to and supported on the holding member 49. The rod 38 is disposed in the external cylinder 37 so as to become movable.

Figure 6:
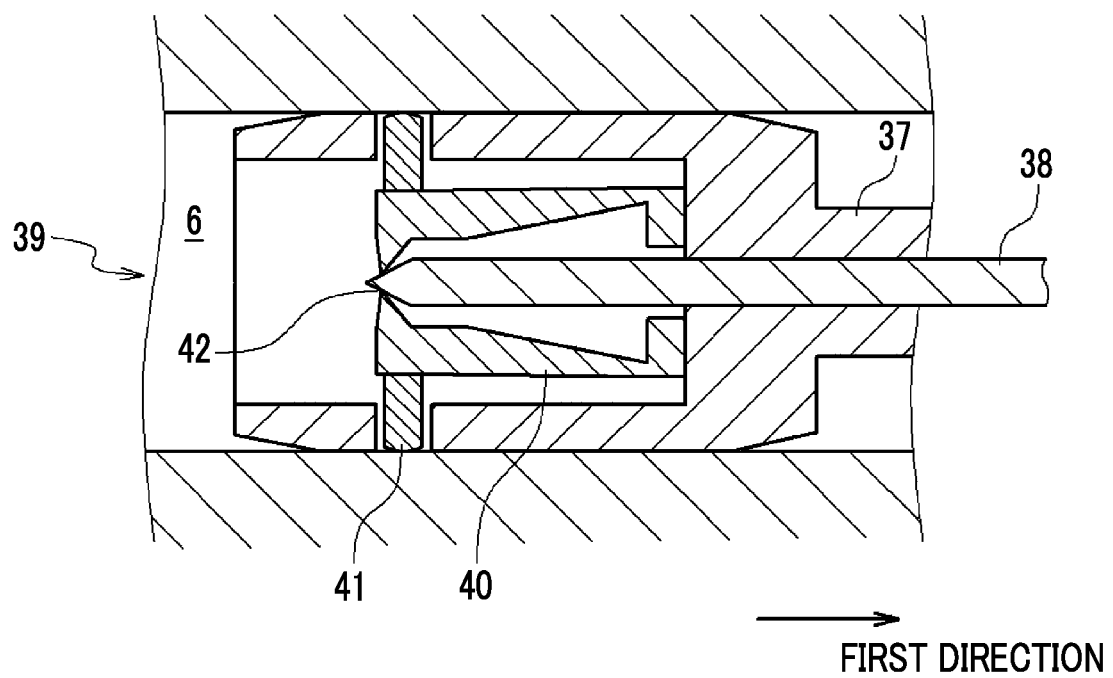
FIG. 6 is a cross-sectional view showing a hole diameter measuring gauge.

Further, a hole diameter measuring gauge 39 is provided at a tip portion of the hole diameter measuring rod 32. FIG. 6 is a cross-sectional view showing the hole diameter measuring gauge 39. In FIG. 6, the hole diameter measuring gauge 39 inserted into the flush bolt hole 6 is shown. As shown in FIG. 6, in the hole diameter measuring gauge 39 section, the diameter of the external cylinder 37 is set so as to be a size corresponding to the size of the flush bolt hole 6 which is the measurement target. Further, a pair of leaf springs 40 and a pair of measuring terminals 41 are provided in the external cylinder 37. Tapered cones 42 extending so as to mutually face a central portion are provided at the pair of leaf springs 40. The pair of measuring terminals 41 extends in a direction orthogonal to an axial direction of the hole diameter measuring rod 32 from the leaf springs 40 so as to protrude from a pair of openings provided in the external cylinder 37. In addition, the pair of measuring terminals 41 is disposed so as to be located in the same straight line shape. Further, a tip portion of the rod 38 has a shape in which a diameter gradually decreases. Then, the tapered cones 42 are in contact with the tip portion of the rod 38.

According to the configuration described above, if the tip portion (the hole diameter measuring gauge 39) of the hole diameter measuring rod 32 is inserted into the flush bolt hole 6, the pair of measuring terminals 41 is pushed inward according to a hole diameter. As a result, the rod 38 is pressed by the pair of tapered cones 42, and thus the rod 38 is displaced along the first direction from the reference position (a position before the insertion). In a case where the hole diameter is large, the amount at which the pair of measuring terminals 41 is pushed in becomes small, and thus the amount of displacement of the rod 38 also becomes small. On the other hand, in a case where the hole diameter is small, the amount at which the pair of measuring terminals 41 is pushed in becomes large, and thus the amount of displacement of the rod 38 also becomes large. The amount of displacement of the rod 38 is measured by the hole diameter measuring sensor 23, and the hole diameter of the flush bolt hole 6 is calculated based on the amount of displacement of the rod 38.

Figure 7:
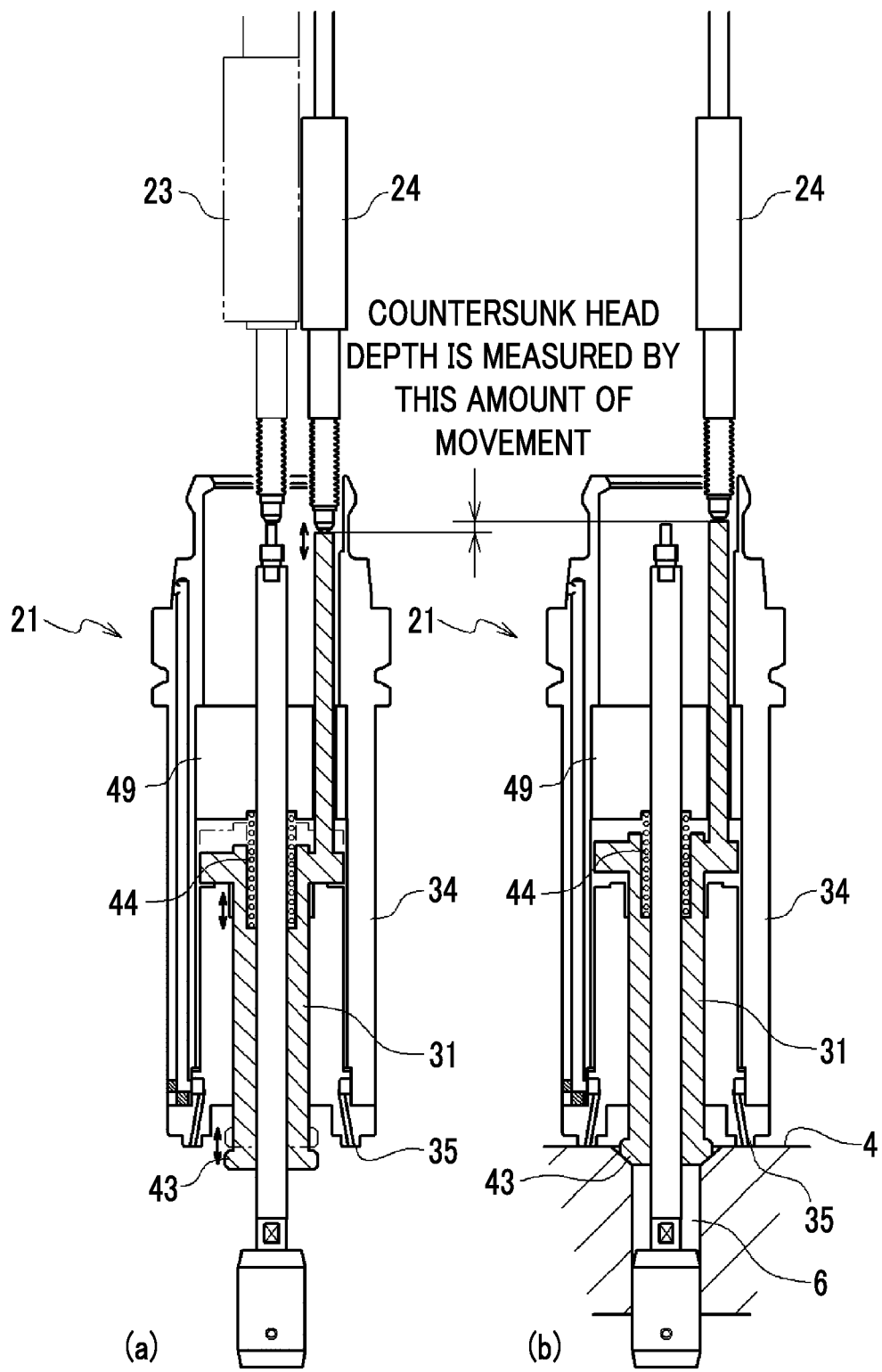
FIG. 7 is a cross-sectional view showing the measuring head.

Next, the countersunk head depth measuring mechanism will be described. FIG. 7 is a cross-sectional view showing the measuring head 21 and shows the configuration of the countersunk head depth measuring rod 31. FIG. 7(a) shows a free state and FIG. 7(b) shows a state at the time of countersunk head depth measurement. As shown in FIG. 7, the countersunk head depth measuring rod 31 has a tubular shape and is supported on the holding member 49 through a spring 44 (an elastic body). In the free state, the tip of the countersunk head depth measuring rod 31 protrudes from the measuring head main body 34. A countersunk head depth measuring tip 43 is provided at the tip of the countersunk head depth measuring rod 31. The diameter of the countersunk head depth measuring tip 43 is the reference diameter. Here, as shown in FIG. 7(b), at the time of measurement, the countersunk head depth measuring tip 43 is inserted into the flush bolt hole 6. Since the countersunk head depth measuring tip 43 has the reference diameter, the countersunk head depth measuring tip 43 comes into contact with a portion in which a diameter in the countersunk head portion 7 becomes the reference diameter. Thereafter, the measuring head main body 34 is moved to the principal surface 4 side until the measurement reference plane 35 comes into contact with the principal surface 4. At this time, since the countersunk head depth measuring rod 31 is supported on the measuring head main body 34 through the spring 44, the countersunk head depth measuring rod 31 is displaced along the first direction relative to the measuring head main body 34. This amount of displacement corresponds to the distance between the measurement reference plane 35 and the countersunk head depth measuring tip 43, that is, a countersunk head depth. Therefore, the countersunk head depth can be measured by measuring the amount of displacement of the countersunk head depth measuring rod 31 by the countersunk head depth measuring sensor 24.

Figure 8:
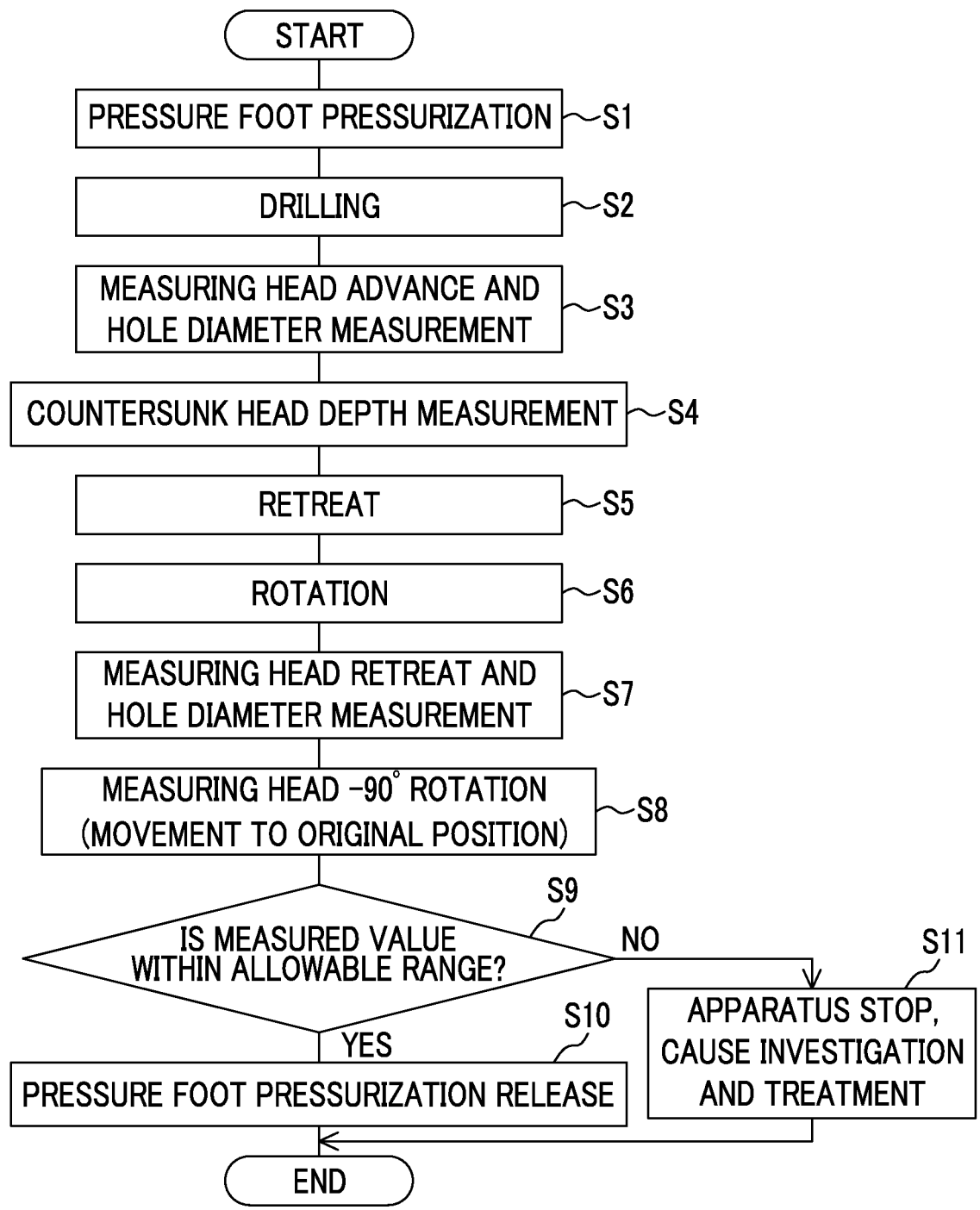
FIG. 8 is a flowchart showing a hole-shape measuring method.

Subsequently, a hole-shape measuring method according to this embodiment will be described. FIG. 8 is a flowchart showing the hole-shape measuring method.

Step S1; Pressurization of Pressure Foot

First, as shown in FIG. 3, the pressure foot 19 is disposed on the principal surface 4. Next, the pressure foot 19 is pressurized, and thus the pressure foot 19 is pressed against the principal surface 4. In this way, even in a case where the principal surface 4 is curved, it is possible to stabilize the original position of the measuring mechanism and the relative position of the principal surface 4.

Step S2; Drilling

Next, the target member 3 is processed through the opening 20 by using a drill (not shown), and thus the flush bolt hole 6 is formed. Thereafter, a drill unit axis and a measuring axis are shifted such that the measuring axis is located on the center of the pressure foot 19.

Step S3; Measuring Head Advance and Hole Diameter Measurement

Next, the measuring head 21 is inserted into the opening 20. FIG. 9 is a cross-sectional view showing a state in a case where the measuring head 21 is inserted into the opening 20. As shown in FIG. 9, the measuring mechanism 12 is moved by the Z-axis servomotor 15 such that the tip portion of the measuring head 21 is inserted into the opening 20.

Figure 10A:
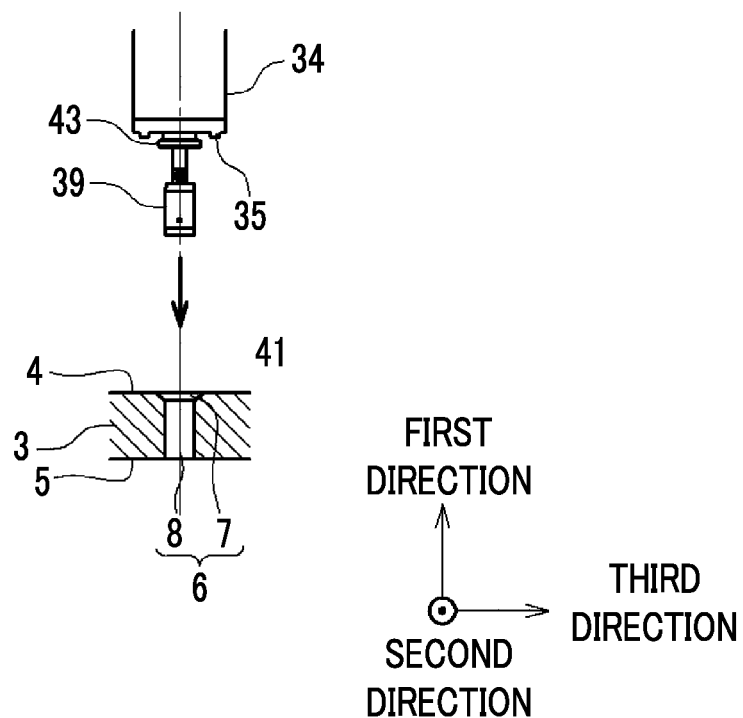
FIG. 10A is a cross-sectional view showing the hole-shape measuring method.
Figure 10B:
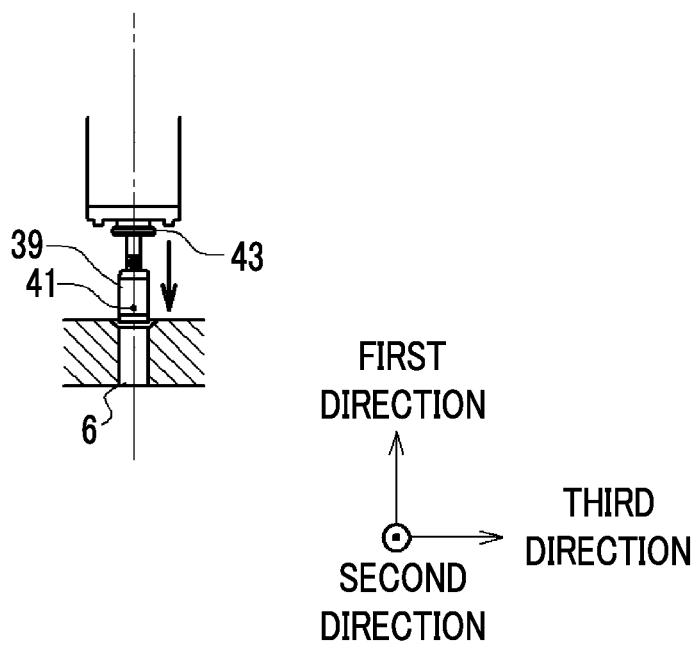
FIG. 10B is a cross-sectional view showing the hole-shape measuring method.
Figure 10C:
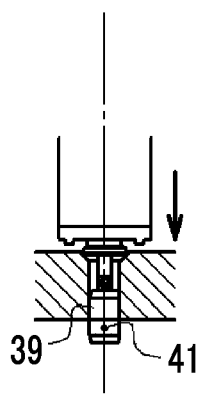
FIG. 10C is a cross-sectional view showing the hole-shape measuring method.

FIGS. 10A to 10I are cross-sectional views showing the hole-shape measuring method. As shown in FIG. 10A, the measuring head main body 34 is disposed just above the flush bolt hole 6, and as shown in FIG. 10B, the hole diameter measuring gauge 39 is inserted into the flush bolt hole 6. Then, as shown in FIGS. 10B and 10C, the hole diameter measuring gauge 39 is moved such that the pair of measuring terminals 41 protrudes from the principal surface 4 side to the back surface 5 side through the constant portion 8. During the movement, a hole diameter of the constant portion 8 is continuously measured by the hole diameter measuring sensor 23 (refer to FIG. 5). The value obtained by the measurement is correlated with a position in the first direction measured by the Z-axis position detection sensor 17 and is notified to a control device (a computer) (not shown). In this way, the diameter of the constant portion 8 in a second direction is calculated for each depth.

Step S4; Countersunk Head Depth Measurement

Figure 10D:
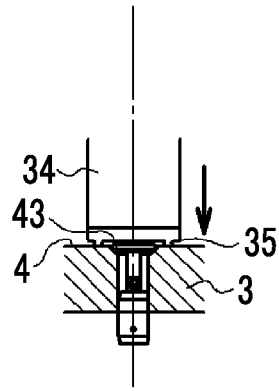
FIG. 10D is a cross-sectional view showing the hole-shape measuring method.

Subsequently, as shown in FIG. 10D, the measuring head main body 34 is moved to the target member 3 side such that the countersunk head depth measuring tip 43 comes into contact with the countersunk head portion 7. In addition, the measuring head main body 34 is moved to the target member 3 side such that the measurement reference plane 35 comes into contact with the principal surface 4, and a countersunk head depth is measured by the countersunk head depth measuring sensor 24 (refer to FIG. 7). Further, when the measurement reference plane 35 comes into contact with the principal surface 4, air is injected from the opening 36 (refer to FIG. 4A). In this way, even in a case where foreign matter or the like is present on the principal surface 4, it is possible to remove the foreign matter or the like, and thus it is possible to reliably bring the measurement reference plane 35 into contact with the principal surface 4.

Step S5; Retreat

Figure 10E:
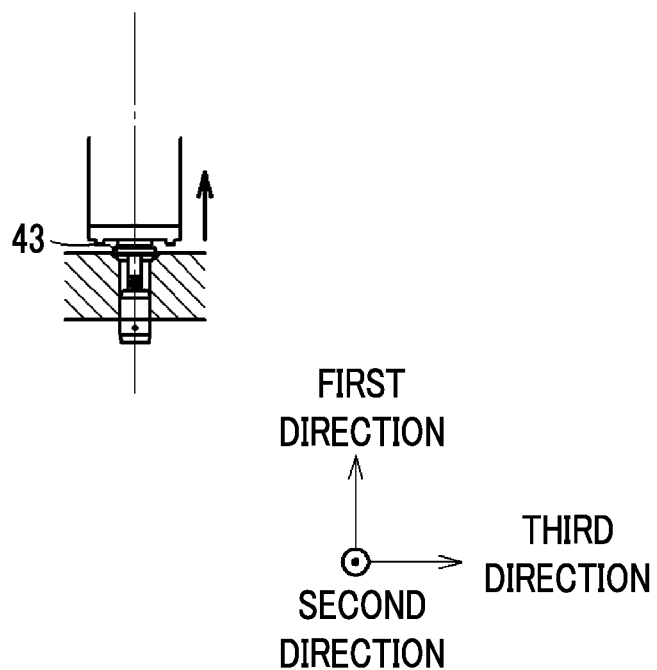
FIG. 10E is a cross-sectional view showing the hole-shape measuring method.

Subsequently, as shown in FIG. 10E, the measuring head main body 34 is retreated such that the countersunk head depth measuring tip 43 is separated from the countersunk head portion 7. For example, the measuring head main body 34 is retreated by about 1 mm.

Step S6; Rotation

Figure 10F:
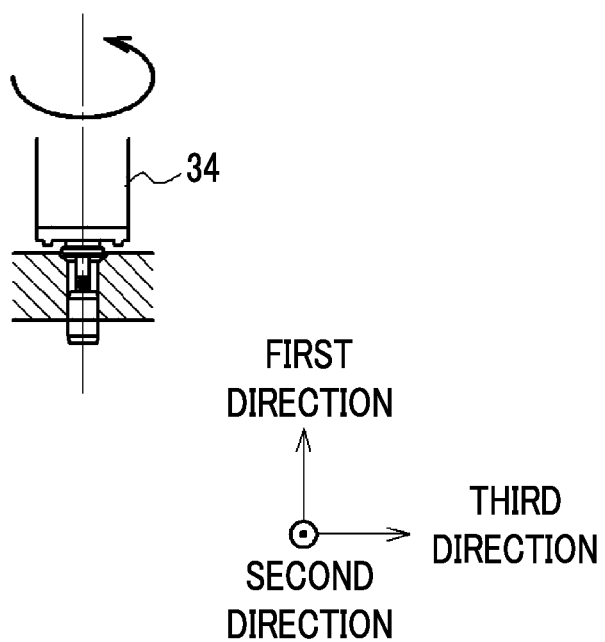
FIG. 10F is a cross-sectional view showing the hole-shape measuring method.

Subsequently, as shown in FIG. 10F, the measuring head main body 34 is rotated by 90° by the measuring head turning actuator 26 (refer to FIG. 4A).

Step S7; Measuring Head Retreat and Hole Diameter Measurement

Figure 10G:
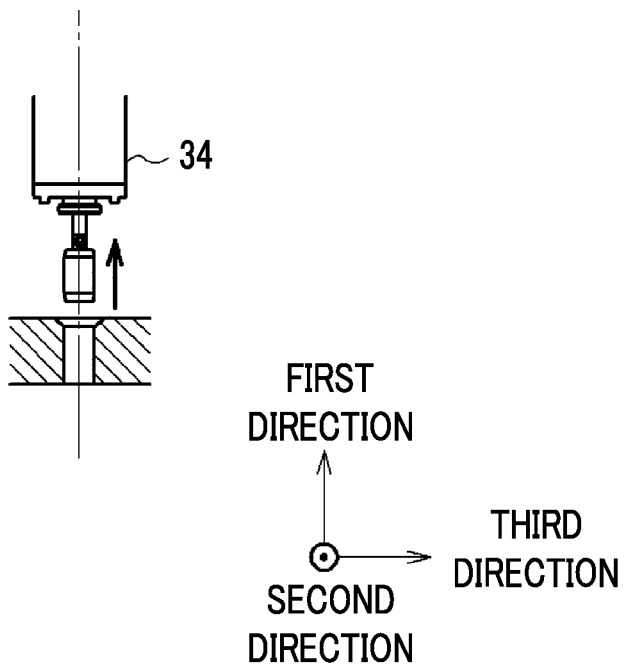
FIG. 10G is a cross-sectional view showing the hole-shape measuring method.
Figure 10H:
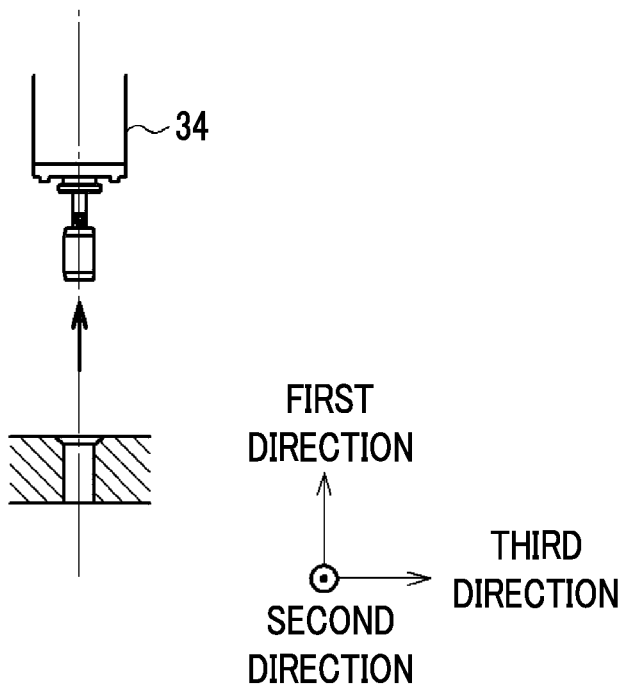
FIG. 10H is a cross-sectional view showing the hole-shape measuring method.

Subsequently, as shown in FIGS. 10G and 10H, the measuring head main body 34 is retreated by the Z-axis servomotor 15 (refer to FIG. 3). During the retreat, a hole diameter in a third direction orthogonal to the second direction is continuously measured by the hole diameter measuring sensor 23 (refer to FIG. 5). The hole diameter that is a measured result is correlated with the position in the first direction measured by the Z-axis position detection sensor 17 (refer to FIG. 3) and is notified to the control device (not shown).

Step S8; Rotation

Figure 10I:
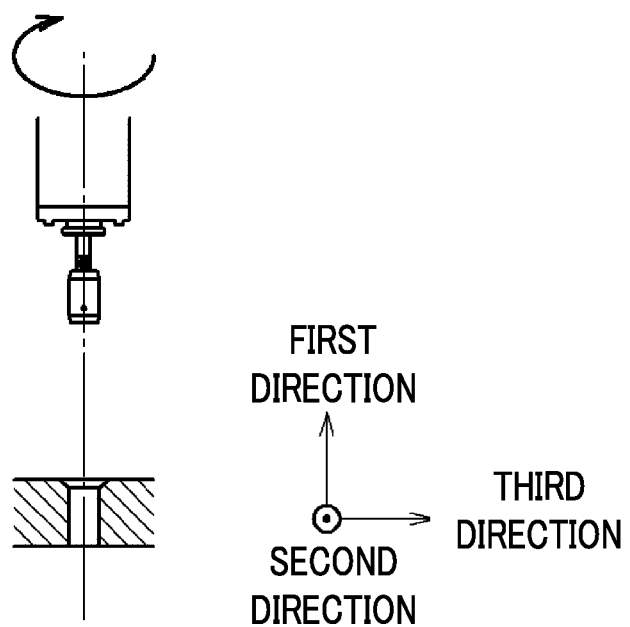
FIG. 10I is a cross-sectional view showing the hole-shape measuring method.

Subsequently, as shown in FIG. 10I, the measuring head main body 34 is rotated by the measuring head turning actuator 26 (refer to FIG. 4A) and returned to the origin position.

Step S9; Is Measured Value Within Allowable Range?

The countersunk head depth of the flush bolt hole 6 is measured by the processing described above. Further, a hole diameter in the second direction and a hole diameter in the third direction are measured at each depth. Whether or not the obtained measured values are within allowable ranges determined in advance is determined by the control device (not shown).

Step S10; Pressure Foot Pressurization Release

In a case where the measured values are within the allowable ranges in Step S9, the pressurization of the pressure foot is released and the processing is ended.

Step S11; Measuring Apparatus Cause Investigation and Treatment

On the other hand, in a case where the measured values are out of the allowable ranges in Step S9, the apparatus is stopped and cause investigation and treatment are performed.

As described above, according to this embodiment, since the countersunk head depth measuring rod 31 and the hole diameter measuring rod 32 are provided so as to become coaxial, it is possible to immediately perform the measurement of the countersunk head depth after the hole diameter measurement. That is, it is possible to measure the shape of the flush bolt hole 6 in a short time.

Further, according to this embodiment, since the balance air cylinder 13 (refer to FIG. 3) is provided, even in a case where deflection occurs between the measuring mechanism 12 and the main body section 11 due to the weight of the measuring mechanism 12, it is possible to cancel the deflection. In this way, it is possible to accurately measure the shape of the flush bolt hole 6.

In addition, according to this embodiment, an air blow mechanism (refer to FIG. 4A, the air blow hose 27, the air flow path 30, and the air flow path 33) is provided and air is injected from the opening 36 provided in the measurement reference plane 35. Foreign matter sometimes exists around the flush bolt hole 6 due to chips or the like at the time of processing. Such foreign matter is blown off by air which is injected from the opening 36, and thus the foreign matter is prevented from being caught between the measurement reference plane 35 and the principal surface 4. In this way, it becomes possible to reliably bring the measurement reference plane 35 into contact with the principal surface 4, and thus it becomes possible to accurately measure a countersunk head depth.

Further, according to this embodiment, a plurality of measuring heads 21 is prepared and the measuring head 21 is selected according to the flush bolt hole 6 that is the measurement target, and is detachably mounted on the measuring head holding mechanism 22. Therefore, even in a case where a plurality of types of holes for flush bolts 6 exists, it becomes possible to measure a shape in a short time.

Further, according to this embodiment, as shown in FIGS. 10A to 10I, a hole diameter in the second direction is measured during the advance of the measuring head main body 34. A countersunk head depth is measured after the advance of the measuring head main body 34. The measuring head main body 34 is rotated after the countersunk head depth measurement. Thereafter, the measuring head main body 34 is retreated at the same time as the measurement of the hole diameter and a hole diameter in the third direction is measured. Therefore, by reciprocating the measuring head main body 34 only once, it is possible to measure the hole diameter in the second direction for each depth, the hole diameter in the third direction for each depth, and the countersunk head depth.

Figure 11:
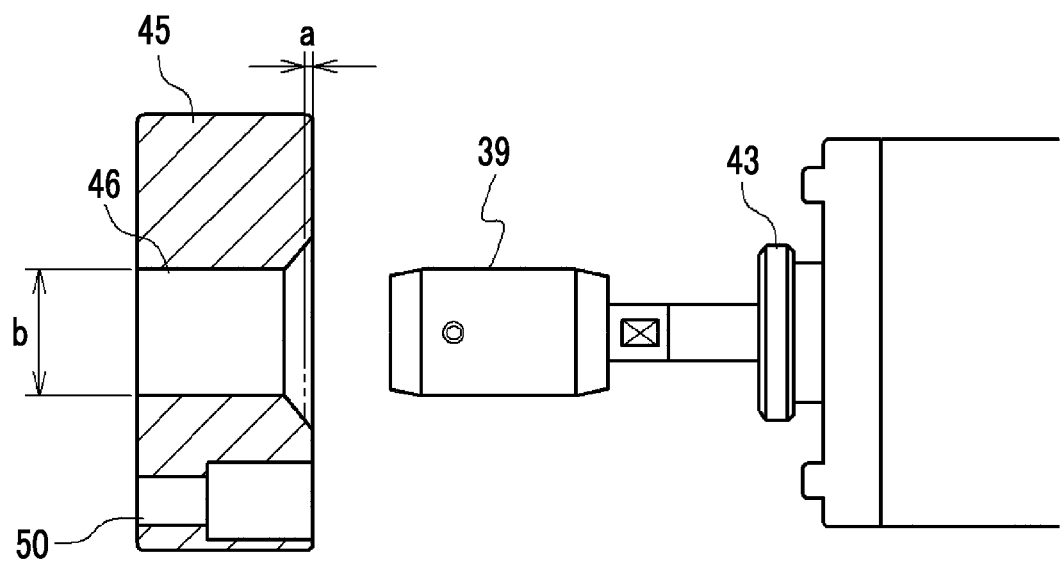
FIG. 11 is a cross-sectional view showing a master gauge.
Figure 12:
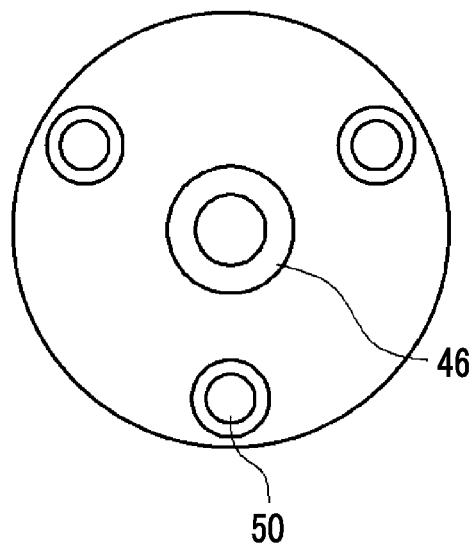
FIG. 12 is a top view of the master gauge.

Incidentally, the hole-shape measuring apparatus according to this embodiment is assembled before measurement and corrected after the assembling. At the time of the correction, a master gauge is used. FIG. 11 is a cross-sectional view showing a master gauge 45 and FIG. 12 is a top view of the master gauge 45. As shown in FIGS. 11 and 12, a reference hole 46 and a mounting hole are provided in the master gauge 45. The reference hole 46 has a known countersunk head depth a and a known hole diameter b. By inserting the hole diameter measuring gauge 39 and the countersunk head depth measuring tip 43 into the reference hole 46 of the master gauge 45 and measuring a countersunk head depth and a hole diameter, it is possible to perform the correction of the hole-shape measuring apparatus. Since the reference hole 46 having the known countersunk head depth a and the known hole diameter b is provided in the master gauge 45, it becomes possible to perform the correction by single measurement.

Figure 13:
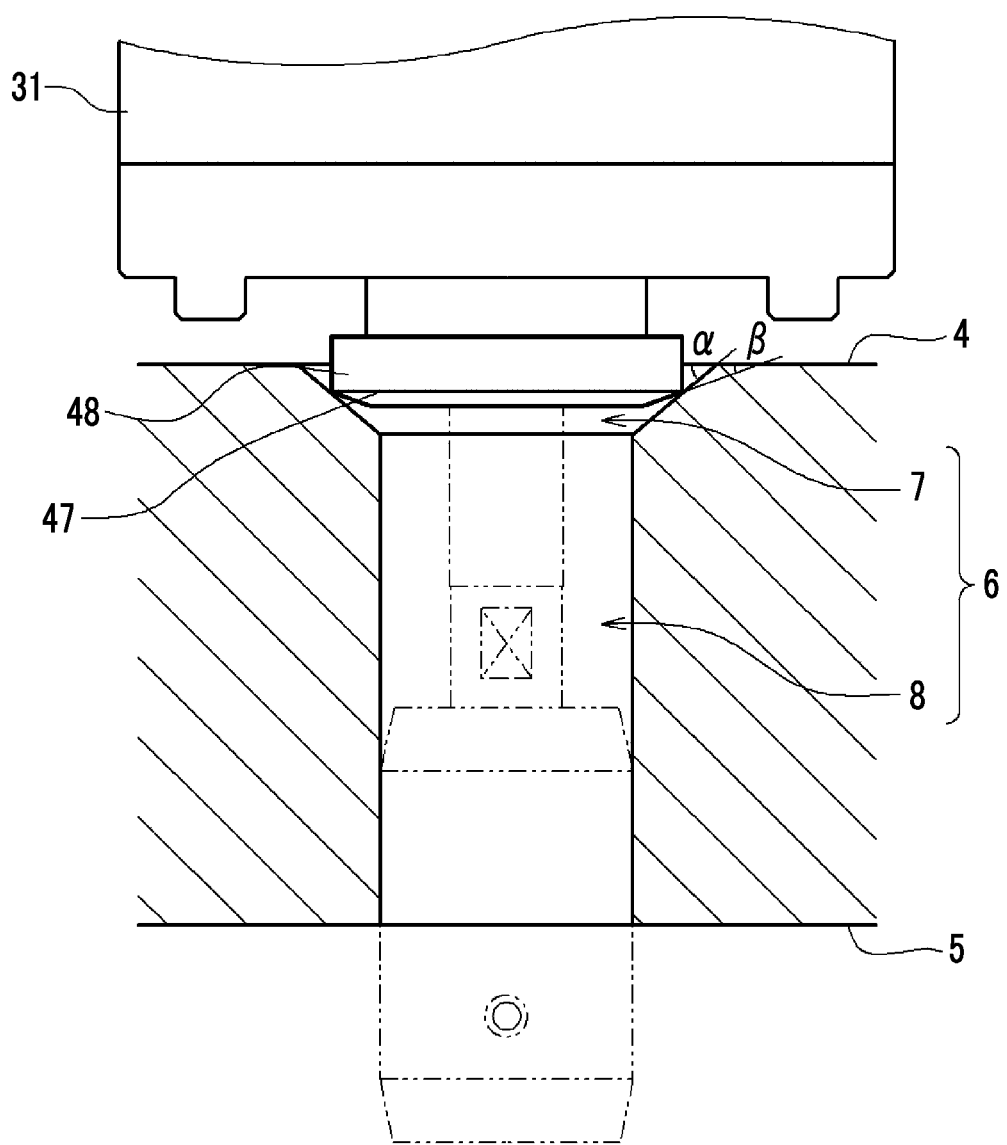
FIG. 13 is a cross-sectional view showing a modified example of a countersunk head depth measuring tip in the embodiment.

Further, in this embodiment, it is possible to further devise the shape of the countersunk head depth measuring tip 43. FIG. 13 is a cross-sectional view showing a modified example of the countersunk head depth measuring tip 43 in this embodiment. In the modified example shown in FIG. 13, the countersunk head depth measuring tip 43 has a reference diameter portion 48 having the reference diameter and a tapered portion 47. The tapered portion 47 is provided at the tip of the reference diameter portion 48 and is a portion in which a diameter decreases as it goes toward the tip. The tapered portion 47 is configured such that when viewed in a cross section, an angle β made by the tapered portion 47 and the principal surface 4 is smaller than an angle α that the wall surface of the countersunk head portion 7 makes with the principal surface 4. Such a configuration is adopted, whereby at the time of the countersunk head depth measurement, the countersunk head depth measuring tip 43 reliably comes into contact with the wall surface of the countersunk head portion 7 at a connection portion between the reference diameter portion 48 and the tapered portion 47. In a case where a configuration is made such that the inclination of the tapered portion 47 is the same as the inclination of the wall surface of the countersunk head portion 7, the position of a portion which comes into contact with the wall surface of the countersunk head portion 7 in the countersunk head depth measuring tip 43 is not stable, and thus there is a case where it is not possible to accurately measure a countersunk head depth. In contrast, according to this modified example, since the countersunk head depth measuring tip 43 reliably comes into contact with the wall surface of the countersunk head portion 7 at the connection portion between the reference diameter portion 48 and the tapered portion 47, it is possible to accurately measure a countersunk head depth.

In addition, this application claims the right of priority based on Japanese Patent Application No. 2012-010478 filed with the Japan Patent Office on Jan. 20, 2012, the entire contents of which are incorporated herein by reference.

The invention claimed is:

1. A hole-shape measuring apparatus for measuring a shape of a flush bolt hole provided in a target member which includes a composite material,
   wherein the flush bolt hole has
   a countersunk head portion which is connected to an opening provided in a principal surface of the target member and has a shape in which a diameter decreases as a depth from the principal surface increases, and
   a constant portion which is connected, at one end, to a bottom portion of the countersunk head portion and connected, at the other end, to an opening provided in a back surface of the target member and has a constant diameter,
   the hole-shape measuring apparatus comprising:
   a hole diameter measuring mechanism which measures a diameter of the constant portion; and
   a countersunk head depth measuring mechanism which measures a depth of the countersunk head portion where a diameter becomes a reference diameter determined in advance, as a countersunk head depth, wherein the hole diameter measuring mechanism has
a hole diameter measuring rod configured so as to be inserted into the constant portion at a tip portion and displaced according to the diameter of the constant portion, and
a hole diameter measuring sensor which measures the amount of displacement of the hole diameter measuring rod,
the countersunk head depth measuring mechanism has
a countersunk head depth measuring rod configured so as to be inserted into the countersunk head portion at a tip portion and displaced according to the countersunk head depth, and
a countersunk head depth measuring sensor which measures the amount of displacement of the countersunk head depth measuring rod, and
the hole diameter measuring rod and the countersunk head depth measuring rod are provided so as to become coaxial.

2. The hole-shape measuring apparatus according to claim 1, wherein the countersunk head depth measuring rod has a tubular shape, and
the hole diameter measuring rod is inserted into the countersunk head depth measuring rod so as to protrude from a tip of the countersunk head depth measuring rod.

3. The hole-shape measuring apparatus according to claim 1, further comprising:
a measuring head holding mechanism; and
a measuring head which is detachably held by the measuring head holding mechanism,
wherein the hole diameter measuring rod and the countersunk head depth measuring rod are mounted on the measuring head,
the hole diameter measuring sensor and the countersunk head depth measuring sensor are mounted on the measuring head holding mechanism,
the hole diameter measuring rod and the hole diameter measuring sensor are provided so as to be connected to each other in a case where the measuring head is mounted on the measuring head holding mechanism, and
the countersunk head depth measuring rod and the countersunk head depth measuring sensor are provided so as to be connected to each other in a case where the measuring head is mounted on the measuring head holding mechanism.

4. The hole-shape measuring apparatus according to claim 3, wherein the measuring head is provided with a measurement reference plane which comes into contact with the principal surface of the target member at the time of measurement of the countersunk head depth,
a countersunk head depth measuring tip is provided at the tip of the countersunk head depth measuring rod,
the countersunk head depth measuring tip is provided with a reference diameter portion which has the reference diameter and comes into contact with a wall surface of the countersunk head portion, and
the countersunk head depth measuring rod is supported on the measuring head through an elastic member such that the countersunk head depth measuring tip protrudes from the measurement reference plane.

5. The hole-shape measuring apparatus according to claim 4, wherein a tapered portion in which a diameter decreases toward a tip side from the reference diameter portion is further formed at the countersunk head depth measuring tip, and
an angle made by the tapered portion and the principal surface is set to be smaller than an angle that the wall surface of the countersunk head portion makes with the principal surface such that the countersunk head depth measuring tip comes into contact with the wall surface of the countersunk head portion at only the reference diameter portion.

6. The hole-shape measuring apparatus according to claim 4, further comprising:
an air blow mechanism,
wherein an opening for air injection is provided in the measurement reference plane, and
the air blow mechanism is configured so as to inject air through the opening for air injection.

7. The hole-shape measuring apparatus according to claim 2, further comprising:
a main body mechanism which supports the measuring head holding mechanism so as to be able to move in a first direction perpendicular to the principal surface of the target member; and
a Z-axis position detection sensor which detects a position of the measuring head holding mechanism with respect to the main body mechanism in the first direction.

8. The hole-shape measuring apparatus according to claim 7, further comprising:
a balance air cylinder which adjusts the position of the measuring head holding mechanism with respect to the main body mechanism.

9. The hole-shape measuring apparatus according to claim 1, further comprising:
a pressure foot which holds down the principal surface of the target member such that the principal surface of the target member becomes a flat surface; and
a mechanism which shifts a hole drilling drill axis and a hole shape measuring axis on a pressure foot hole basis,
wherein an opening for measurement is provided in the pressure foot, and
the hole diameter measuring rod and the countersunk head depth measuring rod are inserted into the flush bolt hole through the opening for measurement.

10. A hole-shape measuring method of measuring a shape of a flush bolt hole provided in a target member which includes a composite material,
wherein the flush bolt hole has
a countersunk head portion which is connected to an opening provided in a principal surface of the target member and has a shape in which a diameter decreases as a depth from the principal surface increases, and
a constant portion which is connected, at one end, to a bottom portion of the countersunk head portion and connected, at the other end, to an opening provided in a back surface of the target member and has a constant diameter,
the hole-shape measuring method comprising:
a step of measuring a diameter of the constant portion by inserting a tip of a hole diameter measuring rod into the constant portion; and
a step of measuring a countersunk head depth of the countersunk head portion by inserting a tip of a countersunk head depth measuring rod provided so as to become coaxial with the hole diameter measuring rod into the countersunk head portion.

11. The hole-shape measuring method according to claim 10, wherein the hole diameter measuring rod is configured so as to be displaced according to a diameter of the flush bolt hole in one direction at the time of insertion into the flush bolt hole, and the step of measuring a diameter of the constant portion includes a step of inserting the tip of the hole diameter measuring rod into the constant portion and measuring a diameter of the constant portion in a second direction, before the step of measuring a countersunk head depth, a step of rotating the hole diameter measuring rod after the step of measuring a countersunk head depth, and a step of measuring a diameter of the constant portion in a third direction by the hole diameter measuring rod after the step of rotating the hole diameter measuring rod.

12. The hole-shape measuring method according to claim 11, wherein the step of rotating the hole diameter measuring rod includes a step of rotating the hole diameter measuring rod by 90°.

13. The hole-shape measuring method according to claim 10, further comprising:

a step of preparing a master gauge provided with a reference hole having a known countersunk head depth and a known hole diameter in advance before the step of measuring a diameter of the constant portion; and a step of measuring the countersunk head depth and the hole diameter of the reference hole by using the hole diameter measuring rod and the countersunk head depth measuring rod and performing correction on the basis of measured results, before the step of measuring a diameter of the constant portion.

\* \* \* \* \*